United States Patent
Zhang et al.

(10) Patent No.: US 6,783,746 B1
(45) Date of Patent: Aug. 31, 2004

(54) PREPARATION OF STABLE NANOTUBE DISPERSIONS IN LIQUIDS

(75) Inventors: Zhiqiang Zhang, Lexington, KY (US); Frances E. Lockwood, Georgetown, KY (US)

(73) Assignee: Ashland, Inc., Lexington, KY (US)

( * ) Notice: Subject to any disclaimer, the term of this patent is extended or adjusted under 35 U.S.C. 154(b) by 0 days.

(21) Appl. No.: 10/021,767

(22) Filed: Dec. 12, 2001

Related U.S. Application Data

(60) Provisional application No. 60/254,959, filed on Dec. 12, 2000.

(51) Int. Cl.[7] .................................................. D01F 9/12
(52) U.S. Cl. ........................ 423/447.1; 516/32; 208/14
(58) Field of Search .......................... 423/447.1, 445 B, 423/460; 516/32; 208/14

(56) References Cited

U.S. PATENT DOCUMENTS

| | | |
|---|---|---|
| 3,994,697 A | 11/1976 | Burke |
| 5,302,450 A | 4/1994 | Rao et al. |
| 5,523,006 A | 6/1996 | Strumban |
| 5,627,140 A | 5/1997 | Fossheim et al. |
| 5,761,583 A | 6/1998 | Custer |
| 5,853,877 A | 12/1998 | Shibuta |
| 5,946,930 A | 9/1999 | Anthony |
| 6,015,065 A | 1/2000 | McAlister |
| 6,031,711 A | 2/2000 | Tennent et al. |
| 6,099,965 A | 8/2000 | Tennent et al. |

FOREIGN PATENT DOCUMENTS

IE 0949199 A1 * 10/1999

OTHER PUBLICATIONS

Bonard et al. "Purification and Size–Selection of Carbon Nanotubes", 1997 Advanced Materials, vol. 9, No. 10, pp. 827–831.*

Instruction manual Publication No. FS–IM–2 published in Nov. of 1996 describing the use of the Fisher Scientific Model 550 Sonic Dismembrator manufactured by Fisher Scientific Company, located in Pittsburgh Pennsylvania.

Scientific Article entitled "Surfactant–Assisted Processing of Carbon Nanotune/Polymer Composites" by Xiaovi Gong, Jun Liu, Suresh Baskaran, Roger D. Boise, and James S. Young in Chemistry of Materials, vol. 12, Issue 4, pp. 1047–1052, (2000).

OLOA 9061 Technical Brochure Material Safety Data Sheet No. 006703 by Chevron Chimical Company LLC in Houston, TX revised on Feb. 14, 1998.

Lubrizol 4999 Technical Brochure Material Safety Data Sheet No. 1272553–1192556 The Lubrizol Corporation in Wickliffe, OH, revised on Feb. 16, 2001 and printed on Jul. 11, 2001.

Lubrizol 9802A Technical Brochure Material Safety Data Sheet No. 1922959–1232446 The Lubrizol Corporation in Wickliffe, OH, revised on Aug. 21, 1999.

Igepal CO–630 Technical Brochure Material Safety Data Sheet from Rhodia Inc. in Cranbury NJ, revised on May 22, 1997.

* cited by examiner

*Primary Examiner*—Stuart L. Hendrickson
*Assistant Examiner*—Peter J Lish
(74) *Attorney, Agent, or Firm*—Carrithers Law Office, PLLC; David W. Carrithers

(57) ABSTRACT

The introduction of nanotubes in a liquid provides a means for changing the physical and/or chemical properties of the liquid. Improvements in heat transfer, electrical properties, viscosity, and lubricity can be realized upon dispersion of nanotubes in liquids; however, nanotubes behave like hydrophobic particles and tend to clump together in liquids. Methods of preparing stable dispersions of nanotubes are described and surfactants/dispersants are identified which can disperse carbon nanotubes in aqueous and petroleum liquid medium. The appropriate dispersant is chosen for the carbon nanotube and the water or oil based medium and the dispersant is dissolved into the liquid medium to form a solution. The carbon nanotube is added to the dispersant containing the solution with agitation, ultrasonication, and/or combinations thereof.

25 Claims, No Drawings

PREPARATION OF STABLE NANOTUBE DISPERSIONS IN LIQUIDS

This application claims priority from United States Provisional application Ser. No. 60/254,959 filed on Dec. 12, 2000 entitled "Methods of Dispersing Carbon Nanotubes in Liquids" and is hereby incorporated by reference herein.

BACKGROUND OF THE INVENTION

1. Technical Field

Methods are described and surfactants are identified which can disperse carbon nanotubes in aqueous and petroleum liquid medium utilizing selected dispersants and mixing methods to form stable carbon nanotube dispersions.

2. Description of the Prior Art

Carbon nanotubes are a new form of the material formed by elemental carbon, which possess different properties than the other forms of the carbon materials. They have unique atomic structure, very high aspect ratio, and extraordinary mechanical properties (strength and flexibility), making them ideal reinforcing fibers in composites and other structural materials.

Carbon nanotubes are characterized as generally to rigid porous carbon three dimensional structures comprising carbon nanofibers and having high surface area and porosity, low bulk density, low amount of micropores and increased crush strength. The instant process is applicable to nanotubes with or without amorphous carbon.

The term "nanotube" refers to elongated structures having a cross section (e.g., angular fibers having edges) or diameter (e.g., rounded) less than 1 micron. The structure may be either hollow or solid. Accordingly, the term includes "nanofibrils" and "bucky tubes". Such structures provide significant surface area when incorporated into a structure because of their size and shape. Moreover, such fibers can be made with high purity and uniformity.

Preferably, the nanotube used in the present invention has a diameter less than 1 micron, preferably less than about 0.5 micron, and even more preferably less than 0.1 micron and most preferably less than 0.05 micron.

The term "internal structure" refers to the internal structure of an assemblage including the relative orientation of the fibers, the diversity of and overall average of fiber orientations, the proximity of the fibers to one another, the void space or pores created by the interstices and spaces between the fibers and size, shape, number and orientation of the flow channels or paths formed by the connection of the void spaces and/or pores. The structure may also include characteristics relating to the size, spacing and orientation of aggregate particles that form the assemblage. The term "relative orientation" refers to the orientation of an individual fiber or aggregate with respect to the others (i.e., aligned versus non-aligned). The "diversity of" and "overall average" of fiber or aggregate orientations refers to the range of fiber orientations within the structure (alignment and orientation with respect to the external surface of the structure).

Carbon nanotubes can be used to form a rigid assemblage or be made having diameters in the range of 3.5 to 70 nanometers. The nanotubes, fibrils, bucky tubes and whiskers that are referred to in this application are distinguishable from continuous carbon fibers commercially available as reinforcement materials. In contrast to nanotubes, which have desirably large, but unavoidably finite aspect ratios, continuous carbon fibers have aspect ratios (L/D) of at least $10^4$ and often $10^6$ or more. The diameter of continuous fibers is also far larger than that of nanotubes, being always >1.0 micron and typically 5 to 7 microns. Continuous carbon fibers are made by the pyrolysis of organic precursor fibers, usually rayon, polyacrylonitrile (PAN) and pitch. Thus, they may include heteroatoms within their structure. The graphitic nature of "as made" continuous carbon fibers varies, but they may be subjected to a subsequent graphitization step. Differences in degree of graphitization, orientation and crystallinity of graphite planes, if they are present, the potential presence of heteroatoms and even the absolute difference in substrate diameter make experience with continuous fibers poor predictors of nanofiber chemistry.

Carbon nanotubes are typically hollow graphite tubules having a diameter of generally several to several tens nanometers. Carbon nanotubes exist in many forms. The nanofibers can be in the form of discrete fibers or aggregate particles of nanofibers. The former results in a structure having fairly uniform properties. The latter results in a structure having two-tiered architecture comprising an overall macrostructure comprising aggregate particles of nanofibers bonded together to form the porous mass and a microstructure of intertwined nanofibers within the individual aggregate particles. For instance, one form of carbon fibrils are characterized by a substantially constant diameter, length greater than about 5 times the diameter, an ordered outer region of catalytically grown, multiple, substantially continuous layers of ordered carbon atoms having an outside diameter between about 3.5 and 70 nanometers, and a distinct inner core region. Each of the layers and the core are disposed substantially concentrically about the cylindrical axis of the fibril. The fibrils are substantially free of pyrolytically deposited thermal carbon with the diameter of the fibrils being equal to the outside diameter of the ordered outer region.

Moreover, a carbon nanotube suitable for use with the instant process defines a cylindrical carbon fibril characterized by a substantially constant diameter between 3.5 and about 70 nanometers, a length greater than about 5 times the diameter and less than about 5000 times the diameter, an outer region of multiple layers of ordered carbon atoms and a distinct inner core region, each of the layers and the core being disposed concentrically about the cylindrical axis of the fibril. Preferably the entire carbon nanotube is substantially free of thermal carbon overcoat. The term "cylindrical" is used herein in the broad geometrical sense, i.e., the surface traced by a straight line moving parallel to a fixed straight line and intersecting a curve. A circle or an ellipse are but two of the many possible curves of the cylinder. The inner core region of the nanotube may be hollow, or may comprise carbon atoms which are less ordered than the atoms of the outer region. "Ordered carbon atoms," as the phrase is used herein means graphitic domains having their c-axes substantially perpendicular to the cylindrical axis of the nanotube. In one embodiment, the length of the nanotube is greater than about 20 times the diameter of the nanotube. In another embodiment, the nanotube diameter is between about 7 and about 25 nanometers. In another embodiment the inner core region has a diameter greater than about 2 nanometers.

Dispersing the nanotubes into organic and aqueous medium has been a serious challenge. The nanotubes tend to aggregate, form agglomerates, and separate from the dispersion.

Some industrial applications require a method of preparing a stable dispersion of a selected carbon nanotube in a liquid medium.

For instance, U.S. Pat. No. 5,523,006 by Strumban teaches the user of a surfactant and an oil medium; however, the particles are Cu—Ni—Sn—Zn alloy particles with the size from 0.01 micron and the suspension is stable for a limited period of time of approximately 30 days. Moreover, the surfactants don't include the dispersants typically utilized in the lubricant industry.

U.S. Pat. No. 5,560,898 by Uchida et al. teaches that a liquid medium is an aqueous medium containing a surfactant; however, the stability of the suspension is of little consequence in that the liquid is centrifuged upon suspension.

U.S. Pat. No. 5,853,877 by Shibuta teaches dispersing disentangled nanotubes in a polar solvent and forming a coating composition with additives such as dispersing agents; however, a method of obtaining a stable dispersion is not taught.

U.S. Pat. No. 6,099,965 by Tennent et al. utilizes a kneader teaching mixing a dispersant with other reactants in a liquid medium using a high-torque dispersing tool, yet sustaining the stability of the dispersion does not appear to be taught nor suggested.

None of the conventional methods taught provide a process for dispersing and maintaining nanotubes in suspension as described and claimed in the instant invention as follows.

SUMMARY OF THE INVENTION

In this invention physical and chemical treatments are combined to derive a method of obtaining a stable nanotube dispersion.

The present invention provides a method of preparing a stable dispersion of a selected carbon nanotube in a liquid medium, such as water or any water based solution, or oil, with the combined use of surfactants and agitation (e.g. ultrasonication) or other means of agitation. The carbon nanotube can be either single-walled, or multi-walled, with typical aspect ratio of 500–5000; however, it is contemplated that nanotubes of other configurations can also be utilized with the instant invention. It is contemplated that a mixture containing carbon nanotubes having a length of 1 micron or more and a diameter of 50 nm or less. The raw material may contain carbon nanotubes having a size outside of the above ranges. The carbon nanotube is not required to be surface treated providing a hydrophilic surface for dispersion into the aqueous medium, but optionally may be treated. The selected surfactant is soluble or dispersible in the liquid medium.

The term "surfactant" in the instant invention refers to any chemical compound that reduces surface tension of a liquid when dissolved into it, or reduces interfacial tension between two liquids, or between a liquid and a solid. It is usually, but not exclusively, a long chain molecule comprised of two moieties: a hydrophilic moiety and a lipophilic moiety. The "hydrophilic" and "lipophilic" moieties refer to the segment in the molecule with affinity for water, and that with affinity for oil, respectively. It is a broad term that covers all materials that have surface activity, including wetting agents, dispersants, emulsifiers, detergents and foaming agents, etc. The term "dispersant" in the instant invention refers to a surfactant added to a medium to promote uniform suspension of extremely fine solid particles, often of colloidal size. In the lubricant industry the term "dispersant" is general accepted to describe the long chain oil soluble or dispersible compounds which function to disperse the "cold sludge" formed in engines. These two terms are mostly interchangeable in the instant invention; however, in some cases the term "dispersant" is used with the tendency to emphasize, but not restrict to, the ones commonly used in the lubricant industry.

The method of making a stable particle-containing dispersions includes physical agitation in combination with chemical treatments. The physical mixing includes high shear mixing, such as with a high speed mixer, homogenizers, microfluidizers, a Kady mill, a colloid mill, etc., high impact mixing, such as attritor, ball and pebble mill, etc., and ultrasonication methods. The mixing methods are further aided by electrostatic stabilization by electrolytes, and steric stabilization by polymeric surfactants (dispersants).

The chemical treatment and the use of the claimed surfactants/dispersants are critical to long term stability of the nanotube fluid mixtures. The treatment involves dissolving a selected dispersant into a selected liquid medium. The chemical method includes a two-step approach: dissolving the dispersant into the liquid medium, and then adding the selected carbon nanotube into the dispersant liquid medium mixture with mechanical agitation and/or ultrasonication. These steps can be reversed but may not produce as satisfactory a result. The liquid medium can be water or any water solution, a petroleum distillate, a petroleum oil, synthetic oil, or vegetable oil. The dispersant for the oily liquid medium is a surfactant with low hydrophile-lipophile balance (HLB) value (HLB<8) or a polymeric dispersant of the type used in the lubricant industry. It is preferably nonionic, or a mixture of nonionics and ionics. A preferred dispersant for the aqueous liquid medium is of high HLB value (HLB>10), preferably a nonylphenoxypoly(ethyleneoxy) ethanol-type surfactant. The uniform dispersion of nanotubes is obtained with a designed viscosity in the liquid medium. The dispersion of nanotubes may be obtained in the form of a paste, gel or grease, in either a petroleum liquid medium or an aqueous medium.

This dispersion may also contain a large amount of one or more other chemical compounds, preferably polymers, not for the purpose of dispersing, but to achieve thickening or other desired fluid characteristics.

It is an object of the present invention to provide a method of preparing a stable dispersion of the carbon nanotube in a liquid medium with the combined use of dispersants and physical agitation.

It is another object of the present invention to utilize a carbon nanotube that is either single-walled, or multi-walled, with typical aspect ratio of 500–5000.

It is another object of the present invention to utilize carbon nanotubes which may optionally be surface treated to be hydrophilic at surface for ease of dispersing into the aqueous medium.

It is another object of the present invention to utilize a dispersant that is soluble for a selected liquid medium.

It is another object of the present invention to utilize a method of preparation dissolving the dispersant into the liquid medium first, and then adding the carbon nanotube into the mixture while being strongly agitated or ultrasonicated.

It is another object of the present invention to add the carbon nanotube into the liquid while being agitated or ultrasonicated, and then adding the surfactant.

It is another object of the present invention to utilize a petroleum distillate or a synthetic petroleum oil as the liquid medium.

It is another object of the present invention to utilize a liquid medium of the type used in the lubricant industry, or a surfactant, or a mixture of surfactants with a low HLB (<8), preferably nonionic or mixture of nonionic and ionic surfactant. More typically, the dispersant can be the ashless polymeric dispersant used in the lubricant industry.

It is another object of the present invention to utilize a dispersant-detergent (DI) additive package typical sold in the lubricant industry as the surfactant/dispersant.

It is another object of the present invention to utilize a liquid medium consisting of water or any water based solution.

It is another object of the present invention to utilize a dispersant having a high HLB (>10), preferably nonylphenoxypoly-(ethyleneoxy)ethanol-type surfactants.

It is another object of the present invention to utilize a uniform dispersion with a designed viscosity having a nanotube in petroleum liquid medium.

It is another object of the present invention to obtain a uniform dispersion in a form as a gel or paste containing nanotubes in petroleum liquid medium or aqueous medium.

It is another object of the present invention to obtain a uniform dispersion of nanotubes in a form as a grease obtained from dispersing carbon nanotube in petroleum liquid medium or aqueous medium.

It is another object of the present invention to form a uniform and stable dispersion of carbon nanotubes containing dissolved non-dispersing, "other" compounds in the liquid oil based medium.

It is yet another object of the present invention to form a uniform and stable dispersion in a form containing carbon nanotubes with dissolved non-dispersing, "other" compounds in the liquid water medium.

The foregoing and other objects and advantages of the invention will be set forth in or apparent from the following description.

DESCRIPTION OF THE PREFERRED EMBODIMENT

The present invention provides a method a dispersing carbon nanotubes into a liquid medium. As set forth above, the nanotubes can be either single-walled, or multi-walled, having a typical nanoscale diameter of 1–500 nanometers. More typically the diameter is around 10–30 nanometers. The length of the tube can be in submicron and micron scale, usually from 500 nanometers to 500 microns.

More typical length is 1 micron to 100 microns. The aspect ratio of the tube can be from hundreds to thousands, more typical 500 to 5000. The surface of the nanotube can be treated chemically to achieve certain level of hydrophilicity by activated carbon treatment, vapor disposition of chemicals, and/or treatment with a strong acid or base, or the carbon nanotubes, fibers, particles or combination thereof can be utilized as is from the production.

A preferred embodiment utilized a carbon nanotube product obtained from Carbolex at the University of Kentucky which contains amorphous carbon particles. The Carbolex carbon nanotubes comprise single walled nanotubes, multi-wall nanotubes, and combinations thereof. Moreover, the combination can include small fractions of the carboneous materials made up of partially disordered spherical particles and/or short carbon nanotubes.

Petroleum Basestocks Liquid Medium

The petroleum liquid medium can be any petroleum distillates or synthetic petroleum oils, greases, gels, or oil-soluble polymer composition. More typically, it is the mineral basestocks or synthetic basestocks used in the lube industry, e.g., Group I (solvent refined mineral oils), Group II (hydrocracked mineral oils), Group III (severely hydrocracked oils, sometimes described as synthetic or semi-synthetic oils), Group IV (polyalphaolefins), and Group VI (esters, naphthenes, and others). One preferred group includes the polyalphaolefins, synthetic esters, and polyalkylglycols.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-octenes), poly(1-decenes), etc., and mixtures thereof; alkylbenzenes (e.g., dodecylbenzenes, tetradecylbenzenes, dinonylbenzenes, di-(2-ethylhexyl) benzenes, etc.); polyphenyls (e.g., biphenyls, terphenyls, alkylated polyphenyls, etc.), alkylated diphenyl, ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic oils.

Another suitable class of synthetic oils comprises the esters of dicarboxylic acids (e.g., phtalic acid, succinic acid, alkyl succinic acids and alkenyl succinic acids, maleic acid, azelaic acid, suberic acid, sebacic acid, fumaric acid, adipic acid, alkenyl malonic acids, etc.) with a variety of alcohols (e.g., butyl alcohol, hexyl alcohol, dodecyl alcohol, 2-ethylhexyl alcohol, ethylene glycol diethylene glycol monoether, propylene glycol, etc.). Specific examples of these esters include dibutyl adipate, di(2-ethylhexyl) sebacate, di-hexyl fumarate, dioctyl sebacate, diisooctyl azelate, diisodecyl azealate, dioctyl phthalate, didecyl phthalate, dicicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc. Other synthetic oils include liquid esters of phosphorus-containing acids (e.g., tricresyl phosphate, trioctyl phosphate, diethyl ester of decylphosphonic acid, etc.), polymeric tetrahydrofurans and the like.

Preferred polyalphaolefins (PAO), include those sold by Mobil Chemical company as SHF fluids, and those sold by Ethyl Corporation under the name ETHYLFLO, or ALBERMARLE. PAO's include the Ethyl-flow series by Ethyl Corporation, "Albermarle Corporation," including Ethyl-flow 162, 164, 166, 168, and 174, having varying viscosity from about 2 to about 460 centistokes.

Mobil SHF-42 from Mobil Chemical Company, Emery 3004 and 3006, and Quantum Chemical Company provide additional polyalphaolefins basestocks. For instance, Emery 3004 polyalphaolefin has a viscosity of 3.86 centistokes (cSt) at 212° F. (100° C.) and 16.75 cSt at 104° F. (40° C.). It has a viscosity index of 125 and a pour point of −98° F. and it also has a flash point of 432° F. and a fire point of 478° F. Moreover, Emery 3006 polyalphaolefin has a viscosity of 5.88 cSt at +212° F. and 31.22 cSt at +104° F. It has a viscosity index of 135 and a pour point of −87° F. It also has a flash point of +464° F. and a fire point of +514° F.

Additional satisfactory polyalphaolefins are those sold by Uniroyal Inc. under the brand Synton PAO-40, which is a 40 centistoke polyalphaolefin. Also useful are the Oronite brand polyalphaolefins manufactured by Chevron Chemical Company.

It is contemplated that Gulf Synfluid 4 cSt PAO, commercially available from Gulf Oil Chemicals Company, a subsidiary of Chevron Corporation, which is similar in many respects to Emery 3004 may also be utilized herein. Mobil SHF-41 PAO, commercially available from Mobil Chemical Corporation, is also similar in many respects to Emery 3004.

Preferably the polyalphaolefins will have a viscosity in the range of about 2–40 centistoke at 100° C., with viscosity of 4 and 10 centistoke being particularly preferred.

The most preferred synthetic based oil ester additives are polyolesters and diesters such as di-aliphatic diesters of alkyl carboxylic acids such as di-2-ethylhexylazelate, di-isodecyladipate, and di-tridecyladipate, commercially available under the brand name Emery 2960 by Emery Chemicals, described in U.S. Pat. No. 4,859,352 to Waynick. Other suitable polyesters are manufactured by Mobil Oil. Mobil polyolester P-43, M-045 containing two alcohols, and Hatco Corp. 2939 are particularly preferred.

Diesters and other synthetic oils have been used as replacements of mineral oil in fluid lubricants. Diesters have outstanding extreme low temperature flow properties and good residence to oxidative breakdown.

The diester oil may include an aliphatic diester of a dicarboxylic acid, or the diester oil can comprise a dialkyl aliphatic diester of an alkyl dicarboxylic acid, such as di-2-ethyl hexyl azelate, di-isodecyl azelate, di-tridecyl azelate, di-isodecyl adipate, di-tridecyl adipate. For instance, Di-2-ethylhexyl azelate is commercially available under the brand name of Emery 2958 by Emery Chemicals.

Also useful are polyol esters such as Emery 2935, 2936, and 2939 from Emery Group of Henkel Corporation and Hatco 2352, 2962, 2925, 2938, 2939, 2970, 3178, and 4322 polyol esters from Hatco Corporation, described in U.S. Pat. No. 5,344,579 to Ohtani et al. and Mobil ester P 24 from Mobil Chemical Company. Mobil esters such as made by reacting dicarboxylic acids, glycols, and either monobasic acids or monohydric alcohols like Emery 2936 synthetic-lubricant basestocks from Quantum Chemical Corporation and Mobil P 24 from Mobil Chemical Company can be used. Polyol esters have good oxidation and hydrolytic stability. The polyol ester for use herein preferably has a pour point of about –100° C. or lower to –40° C. and a viscosity of about 2–460 centistoke at 100° C.

Group III oils are often referred to as hydrogenated oil to be used as the sole base oil component of the instant invention providing superior performance to conventional motor oils with no other synthetic oil base or mineral oil base.

A hydrogenated oil is a mineral oil subjected to hydrogenation or hydrocracking under special conditions to remove undesirable chemical compositions and impurities resulting in a mineral oil based oil having synthetic oil components and properties. Typically the hydrogenated oil is defined as a Group III petroleum based stock with a sulfur level less than 0.03, severely hydrotreatd and isodewaxed with saturates greater than or equal to 90 and a viscosity index of greater than or equal to 120 may optionally be utilized in amounts up to 90 percent by volume, more preferably from 5.0 to 50 percent by volume and more preferably from 20 to 40 percent by volume when used in combination with a synthetic or mineral oil.

The hydrogenated oil my be used as the sole base oil component of the instant invention providing superior performance to conventional motor oils with no other synthetic oil base or mineral oil base. When used in combination with another conventional synthetic oil such as those containing polyalphaolefins or esters, or when used in combination with a mineral oil, the hydrogenated oil may be present in an amount of up to 95 percent by volume, more preferably from about 10 to 80 percent by volume, more preferably from 20 to 60 percent by volume and most preferably from 10 to 30 percent by volume of the base oil composition.

A Group I or II mineral oil basestock may be incorporated in the present invention as a portion of the concentrate or a basestock to which the concentrate may be added. Preferred as mineral oil basestocks are the ASHLAND 325 Neutral defined as a solvent refined neutral having a SABOLT UNIVERSAL viscosity of 325 SUS @ 100° F. and ASHLAND 100 Neutral defined as a solvent refined neutral having a SABOLT UNIVERSAL viscosity of 100 SUS @ 100° F., manufactured by the Marathon Ashland Petroleum.

Other acceptable petroleum-base fluid compositions include white mineral, paraffinic and MVI naphthenic oils having the viscosity range of about 20–400 centistokes. Preferred white mineral oils include those available from Witco Corporation, Arco Chemical Company, PSI and Penreco. Preferred paraffinic oils include solvent neutral oils available from Exxon Chemical Company, HVI neutral oils available from Shell Chemical Company, and solvent treated neutral oils available from Arco Chemical Company. Preferred MVI naphthenic oils include solvent extracted coastal pale oils available from Exxon Chemical Company, MVI extracted/acid treated oils available from Shell Chemical Company, and naphthenic oils sold under the names Hydro-Cal and Calsol by Calumet, and described in U.S. Pat. No. 5,348,668 to Oldiges.

Finally, vegetable oils may also be utilizes as the liquid medium in the instant invention.

Aqueous Medium

The selected aqueous medium is water, or it can be any water-based solution including alcohol and its derivatives, such as glycols or any water-soluble inorganic salt or organic compound.

Surfactants/Dispersants

Dispersant Used in Lubricant Industry

Dispersants used in the lubricant industry are typically used to disperse the "cold sludge" formed in gasoline and diesel engines, which can be either "ashless dispersants", or containing metal atoms. They can be used in the instant invention since they have been found to be an excellent dispersing agent for soot, an amorphous form of carbon particles generated in the engine crankcase and incorporated with dirt and grease.

The ashless dispersants commonly used in the automotive industry contain an lipophilic hydrocarbon group and a polar functional hydrophilic group. The polar functional group can be of the class of carboxylate, ester, amine, amide, imine, imide, hydroxyl, ether, epoxide, phosphorus, ester carboxyl, anhydride, or nitrile. The lipophilic group can be oligomeric or polymeric in nature, usually from 70 to 200 cabon atoms to ensure oil solubility. Hydrocarbon polymers treated with various reagents to introduce polar functions include products prepared by treating polyolefins such as polyisobutene first with maleic anhydride, or phosphorus sulfide or chloride, or by thermal treatment, and then with reagents such as polyamine, amine, ethylene oxide, etc.

Of these ashless dispersants the ones typically used in the petroleum industry include N-substitued polyisobutenyl succinimides and succinates, allkyl methacrylate-vinyl pyrrolidinone copolymers, alkyl methacrylate-dialkylaminoethyl methacrylate copolymers, alkylmethacrylate-polyethylene glycol methacrylate copolymers, and polystearamides. Preferred oil-based dispersants that are most important in the instant application include dispersants from the chemical classes of alkylsuccinimide, succinate esters, high molecular weight amines, Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, bis-hydroxypropyl phosphorate. The dispersant may be combined with other additives used in the lubricant industry to form a "dispersant-detergent (DI)" additive package, e.g., Lubrizol™ 9802A, and the whole DI package can be used as dispersing agent for the nanotube suspension.

For instance, LUBRIZOL 9802A is described in the technical brochure (MATERIAL SAFETY DATA SHEET No. 1922959-1232446-3384064) by The Lubrizol Corporation in Wickliffe, Ohio and is hereby incorporated by reference. LUBRIZOL 9802A is described as a motor oil additive is believed to contain as an active ingredient a zinc dithiophosphate and/or zinc alkyldithiophosphate.

LUBRIZOL 4999 is described in its Technical Brochure (MATERIAL SAFETY DATA SHEET No. 1272553-1192556-3310026) by the Lubrizol Corporation in Wickliffe, Ohio and is hereby incorporated by reference. LUBRIZOL 9802A is described as a engine oil additive and contains as an active ingredient from 5 to 9.9 percent of a zinc alkyldithiophosphate.

OLOA 9061 is described in Technical Brochure "MATERIAL SAFETY DATA SHEET No. 006703" by Chevron Chemical Company LLC and is hereby incorporated by reference. OLOA 9061 is described as zinc alkyl dithiophosphate compound.

IGEPAL CO-630 is described in Technical Brochure "MATERIAL SAFETY DATA SHEET" from Rhodia Inc. and is hereby incorporated by reference. IGEPAL CO-630 is described as a nonylphenoxy poly(ethyleneoxy) ethanol, branched compound.

Other Types of Dispersants

Alternatively a surfactant or a mixture of surfactants with low HLB value (typically less than or equal to 8), preferably nonionic, or a mixture of nonionics and ionics, may be used in the instant invention.

The dispersant for the water based carbon nanotube dispersion should be of high HLB value (typically less than or equal to 10), preferable nonylphenoxypoly (ethyleneoxy) ethanol-type surfactants are utilized.

In both the water and oil based cases, the dispersants selected should be soluble or dispersible in the liquid medium.

The dispersant can be in a range of up from 0.001 to 30 percent, more preferably in a range of from between 0.5 percent to 20 percent, more preferably in a range of from between 1.0 to 8.0 percent, and most preferably in a range of from between 2 to 6 percent. The carbon nanotube can be of any desired weight percentage in a range of from 0.0001 up to 50 percent. For practical application it is usually in a range of from between 0.01 percent to 2 percent, and most preferably in a range of from between 0.05 percent to 0.5 percent. The remainder of the formula is the selected oil or water medium.

It is believed that in the instant invention the dispersant functions by adsorbing onto the surface of the carbon nanotube. The dispersant contains a hydrophilic segment and a hydrophobic segment which surrounds the carbon particles thereby providing a means for isolating and dispersing the carbon particles. The selection of a dispersant having a particular HLB value is important to determine the dispersant characteristics such as rate and the degree of stabilization over time.

Other Chemical Compound Additives

This dispersion may also contain a large amount of one or more other chemical compounds, preferably polymers, not for the purpose of dispersing, but to achieve thickening or other desired fluid characteristics.

The viscosity improvers used in the lubricant industry can be used in the instant invention for the oil medium, which include olefin copolymers (OCP), polymethacrylates (PMA) hydrogenated styrene-diene (STD), and styrene-polyester (STPE) polymers. Olefin copolymers are rubber-like materials prepared from ethylene and propylene mixtures through vanadium-based Ziegler-Natta catalysis. Styrene-diene polymers are produced by anionic polymerization of styrene and butadiene or isoprene. Polymethacrylates are produced by free radical polymerization of alkyl methacrylates. Styrene-polyester polymers are prepared by first co-polymerizing styrene and maleic anhydride and then esterifying the intermediate using a mixture of alcohols.

Other compounds which can be used in the instant invention in either the aqueous medium or the oil medium include: acrylic polymers such as polyacrylic acid and sodium polyacrylate, high-molecular-weight polymers of ethylene oxide such as Polyox® WSR from Union Carbide, cellulose compounds such as carboxymethylcellulose, polyvinyl alcohol (PVA), polyvinyl pyrrolidone (PVP), xanthan gums and guar gums, polysaccharides, alkanolamides, amine salts of polyamide such as Disparlon AQ series from King Industries, hydrophobically modified ethylene oxide urethane (e.g., Acrysol series from Rohmax), silicates, and fillers such as mica, silicas, cellulose, wood flour, clays (including organoclays) and nanoclays, and resin polymers such as polyvinyl butyral resins, polyurethane resins, acrylic resins and epoxy resins.

Chemical compounds such as plasticizers can also be used in the instant invention and may be selected from the group including phthalate, adipates, sebacate esters, and more particularly: glyceryl tri(acetoxystearate), epoxidized soybean oil, epoxidized linseed oil, N,n-butyl benzene sulfonamide, aliphatic polyurethane, epoxidized soy oil, polyester glutarate, polyester glutarate, triethylene glycol caprate/caprylate, long chain alkyl ether, dialkyl diester glutarate, monomeric, polymer, and epoxy plasticizers, polyester based on adipic acid, hydrogenated dimer acid, distilled dimer acid, polymerized fatty acid trimer, ethyl ester of hydrolyzed collagen, isostearic acid and sorbian oleate and cocoyl hydrolyzed keratin, PPG-12/PEG-65 lanolin oil, dialkyl adipate, alkylaryl phosphate, alkyl diaryl phosphate, modified triaryl phosphate, triaryl phosphate, butyl benzyl phthalate, octyl benzyl phthalate, alkyl benzyl phthalate, dibutoxy ethoxy ethyl adipate, 2-ethylhexyldiphenyl phosphate, dibutoxy ethoxy ethyl formyl, diisopropyl adipate, diisopropyl sebacate, isodecyl oleate, neopentyl glycol dicaprate, neopenty glycol diotanoate, isohexyl neopentanoate, ethoxylated lanolins, polyoxyethylene cholesterol, propoxylated (2 moles) lanolin alcohols, propoxylated lanoline alcohols, acetylated polyoxyethylene derivatives of lanoline, and dimethylpolysiloxane. Other plasticizers which may be substituted for and/or used with the above plasticizers including glycerine, polyethylene glycol, dibutyl phthalate, and 2,2,4-trimethyl-1,3-pentanediol monoisobutyrate, and diisononyl phthalate all of which are soluble in a solvent carrier.

Physical Agitation

The physical mixing includes high shear mixing, such as with a high speed mixer, homogenizers, microfluidizers, a Kady mill, a colloid mill, etc., high impact mixing, such as attritor, ball and pebble mill, etc., and ultrasonication methods.

Ultrasonication is the most preferred physical method in the instant invention since it is less destructive to the carbon nanotube structure than the other methods described. Ultrasonication can be done either in the bath-type ultrasonicator, or by the tip-type ultrasonicator. More typically, tip-type ultrasonication is applied for higher energy output. Sonication at the medium-high instrumental intensity for up to 30 minutes, and usually in a range of from 10 to 20 minutes is desired to achieve better homogeneity.

One dismembrator useful for preparing the instant invention is a Model 550 Sonic dismembrator manufactured by Fisher Scientific Company, located in Pittsburgh Pennsylvania. The instruction manual Publication No. FS-IM-2 published in November of 1996 describing the use of the Fisher Scientific Model 550 Sonic Dismembrator is hereby incorporated by reference. The generator power supply converst conventional 50/60 Hz AC line power to 20 kHZ electrical energy which is fed to the converter where it is transformed to mechanical vibration. The heart of the convertor is a lead zirconate titanate (Piezoelectric) crystal which, when subjected to an alternating voltage, expands and contracts. The convertor vibrates in the longitudinal direction and transmits this motion to the horn tip immersed in the liquid solution. Cavitation results, in which microscopic vapor bubbles are formed momentarily and implode, causing powerful shock waves to radiate throughout the sample from the tip face. Horns and probes amplify the longitudinal vibration of the convertor; higher amplification (or gain) results in more intense cavitational action and greater disruption. The larger the tip of the probe, the larger the volume that can be processed but at lesser intensity. The convertor is tuned to vibrate at a fixed frequency of 20 kHZ. All horns and probes are resonant bodies, and are also tuned to vibrate at 20 kHZ. Of course it is contemplated that other models and competing ultrasonic mixing devices could be utilized in accordance with the present invention.

The raw material mixture may be pulverized by any suitable known dry or wet grinding method. One grinding method includes pulverizing the raw material mixture in the fluid mixture of the instant invention to obtain the concentrate, and the pulverized product may then be dispersed further in a liquid medium with the aid of the dispersants described above. However, pulverization or milling reduces the carbon nanotube average aspect ratio.

The instant method of forming a stable suspension of nanotubes in a solution consist of two primary steps. First select the appropriate dispersant for the carbon nanotube and the medium, and dissolve the dispersant into the liquid medium to form a solution, and second add the carbon nanotube into the dispersant containing solution while strongly agitating, ball milling, or ultrasonication of the solution.

The present invention is further described and illustrated in the following examples:

EXAMPLES

Example 1

| Components | Description | Weight percentage |
|---|---|---|
| Carbon nanotube | Surface untreated, aspect ratio 2000, diameter 25 nm, length 50 μm | 0.1 |
| Dispersant | Lubrizol ™ 9802A | 4.8 |
| Liquid | Poly(a-olefin), 6 cSt | 95.1 |
| Sonication | Fisher Scientific 550 Sonic Dismembrator, 15 minutes | |

Example 2

| Components | Description | Weight percentage |
|---|---|---|
| Carbon nanotube | Surface untreated, aspect ratio 2000, diameter 25 nm, length 50 μm | 0.1 |
| Dispersant | Lubrizol ™ 4999 | 4.8 |
| Liquid | Poly(a-olefin), 6 cSt | 95.1 |
| Sonication | Fisher Scientific 550 Sonic Dismembrator, 15 minutes | |

Example 3

| Components | Description | Weight percentage |
|---|---|---|
| Carbon nanotube | Surface untreated, aspect ratio 2000, diameter 25 nm, length 50 μm | 0.1 |
| Dispersant | OLOA 9061 | 4.8 |
| Liquid | Poly(a-olefin), 6 cSt | 95.1 |
| Sonication | Fisher Scientific 550 Sonic Dismembrator, 15 minutes | |

Example 4

| Components | Description | Weight percentage |
|---|---|---|
| Carbon nanotube | Surface treated | 0.1 |
| Dispersant | Igepal ™ CO-630 | 5.0 |
| Liquid | Water | 94.9 |
| Sonication | Fisher Scientific 550 Sonic Dismembrator, 15 minutes | |

The dispersions in Examples 1–4 are very uniform, and will remain in a stable dispersion without any sign of separation or aggregation for at least a year.

It is contemplated that substitute dispersants could be utilized in the examples set forth in Examples 1–4 and yield yield similar results. For instance, in Example 1 up to 4.8 weight percent of a zinc dithiophosphate could be substituted for the LUBRIZOL 9802A since it is the primary active ingredient of the product. In Example 2, up to 4.8 weight percent of a zinc alkyldithiophosphate could be substituted for the LUBRIZOL 4999 product and be expected to yield similar results since a zinc alkyldithiophosphate is the active ingredient in the LUBRIZOL 4999 product. In Example 3, up to 4.8 weight percent a zinc alkyl dithiophosphate compound could be substituted for the OLOA 9061 since the alkyl dithiophosphate compound is the active ingredient in the OLOA 9061 product. Finally, in Example 4, up to 5.0 weight percent of a nonylphenoxy poly(ethyleneoxy) ethanol, branched compound could be substituted fro the IGEPAL CO-630 product since the nonylphenoxy poly(ethyleneoxy) ethanol, branched compound is the primary active ingredient in the IGEPAL CO-630 product. Moreover, the weight percent of the carbon nanotube can be up to 10 weight percent, and more preferably up to 1 weight percent and most preferably from 0.01 to 1 weight percent in the formulations depending upon the preferred viscosity and chemical and physical properties of the resulting products. Accordingly the weight percent of the liquid medium can be reduced and the weight percent of the dispersant can be increased up to 20 weight percent, more preferably from 0.01 to 10 weight percent and most preferably from 3 to 6 weight percent. The amount of nanotubes, dispersant, and liquid medium can be varied as long as the desired HBL value is maintained to produce compounds having a gel, grease, or wax type consistency.

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein. Reference to documents made in the specification is intended to result in such patents or literature cited are expressly incorporated herein by reference, including any patents or other literature references cited within such documents as if fully set forth in this specification. The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

What is claimed is:

1. A method of preparing a stable dispersion of carbon nano particles in a liquid, comprising the steps of:
   dissolving a dispersant comprising a surfactant having a low hydrophile-lipophile balance (HLB) value of 8 or less in an amount of from 0.001 to 30.0 percent, into a major amount of a liquid medium selected from the group consisting of a mineral oil, a hydrogenated oil, a vegetable oil, a synthetic oil, and combinations thereof forming a dispersant liquid medium;
   adding carbon nano material having an aspect ratio of from 500 to 5,000 in an amount of from 0.01 to 10.0 percent by weight into said dispersant liquid medium with mechanical agitation; and
   forming a uniform suspension of colloidal size solid particles.

2. A method of preparing a stable dispersion of carbon nano particles in a liquid, comprising the steps of:
   dissolving a dispersant in an amount of from 0.001 to 30.0 percent comprising a surfactant having a low hydrophile-lipophile balance (HLB) value of 8 or less into a major amount of a liquid medium selected from the group consisting of a mineral oil, a hydrogenated oil, a vegetable oil, a synthetic oil, and combinations thereof forming a dispersant liquid medium;
   adding carbon nano material having an aspect ratio of from 500 to 5000 in an amount of from 0.01 to 10.0 percent by weight into said dispersant liquid medium with ultrasonification; and
   forming a uniform suspension of colloidal size solid particles.

3. The method according to claim 1, wherein said dispersant comprises an ashless polymeric dispersant.

4. The method according to claim 3, wherein said ashless polymeric dispersant comprises a lipophilic hydrocarbon group and a polar hydrophilic functional group.

5. The method according to claim 4, wherein said polar hydrophilic functional group is selected from the group consisting of a carboxylate, ester, amine, amide, imine, imide, hydroxyl, ether, epoxide, phosphorus, ester carboxyl, anhydride, nitrile, and combinations thereof.

6. The method according to claim 4, wherein said lipophilic hydrocarbon group comprises from 70 to 200 carbon atoms to ensure oil solubility.

7. The method according to claim 1, including the step of adding electrolytes to aid in electrostatic stabilization.

8. The method according to claim 1, wherein said mechanical agitation is comprises the step of mixing said carbon nano particles using a high shear mixer selected from the group consisting of a high speed mixer, homogenizer, microfluidizer, a Kady mill, a colloid mill, a high impact mixer, a attritor, a ball and pebble mill, and combinations thereof.

9. The method according to claim 1, including the step of adding a viscosity improver.

10. The method according to claim 9, wherein said viscosity improver is selected from the group consisting of an olefin copolymer, a polymethacrylate, a hydrogenated styrene-diene, a styrene-polyester polymer, and combinations thereof.

11. The method according to claim 9, including a thickening agent selected from the group consisting of a polyacrylic acid and sodium polyacrylate, a high-molecular-weight polymer of ethylene oxide, a carboxymethylcellulose, a polyvinyl alcohol, a polyvinyl pyrrolidone, and combinations thereof.

12. The method according to claim 1, including the step of adding a plasticizer.

13. The method according to claim 12, wherein said plasticizer is selected from the group consisting of a phthalate, an adipate, a sebacate ester, a glyceryl tri (acetoxystearate), an epoxidized soybean oil, an epoxidized linseed oil, a N, n-butyl benzene sulfonamide, an aliphatic polyurethane, a polyester glutarate, a triethylene glycol, a caprate/caprylate, a long chain alkyl ether, a dialkyl diester glutarate, a monomeric polymer, a polyester based on adipic acid, a hydrogenated dimer acid, a distilled dimer acid, a polymerized fatty acid trimer, an ethyl ester of hydrolyzed collagen, an isostearic acid, a sorbian oleate, a cocoyl hydrolyzed keratin, a lanolin oil, a dialkyl adipate, an alkylaryl phosphate, an alkyl diaryl phosphate, a modified triaryl phosphate, triaryl phosphate, a butyl benzyl phthalate, an octyl benzyl phthalate, an alkyl benzyl phthalate, a dibutoxy ethoxy ethyl adipate, a 2-ethylhexyldiphenyl phosphate, a dibutoxy ethoxy ethyl formyl, a diisopropyl adipate, a diisopropyl sebacate, an isodecyl oleate, a neopentyl glycol dicaprate, a neopenty glycol diotanoate, an isohexyl neopentanoate, an ethoxylated lanolin, a polyoxyethylene cholesterol, a propoxylated (2 moles) lanolin alcohol, a propoxylated lanoline alcohol, an acetylated polyoxyethylene derivative of lanoline, a dimethylpolysiloxane, a glycerine, a polyethylene glycol, a dibutyl phthalate, a 2,2,4-trimethyl-1,3-pentanediol monoisobutyrate, a diisononyl phthalate, and combinations thereof.

14. The method according to claim 1, wherein said dispersant is selected from the group comprising a zinc dithiophosphate, a zinc alkyldithiophosphate, and combinations thereof.

15. The method according to claim 1, wherein said dispersant comprises a surfactant added to said liquid medium promoting uniform suspension of extremely fine solid particles of colloidal size.

16. The method according to claim 1, wherein said dispersant comprises a long chain oil soluble or dispersible compound which functions to disperse the "cold sludge" formed in engines.

17. The method according to claim 1, wherein said mineral oil comprises a solvent refined neutral oil, a white mineral oil, a paraffinic oil, a MVI naphthenic oil, and combinations thereof.

18. The method according to claim 1, wherein said mineral oil further comprises a hydrocracked mineral oil.

19. The method according to claim 1, wherein said hydrogenated oil comprises a severely hydrocracked mineral oil.

20. The method according to claim 1, wherein said synthetic oil is selected from the group consisting of a polyalphaolefin, an ester , a naphthene, a polyalkylglycol, a hydrocarbon oil, a halo-substituted hydrocarbon oil such as polymerized and interpolymerized olefins, a polybutylene, a polypropylene, a propylene-isobutylene copolymer, a chlorinated polybutylene, a poly(1-octenes), a poly(1-decenes), an alkylbenzene, a dodecylbenzene, a tetradecylbenzene, a dinonylbenzene, a di-(2ethylhexyl) benzene, a polypheny, a biphenyl, a terphenyl, an alkylated polyphenyl, an alkylated diphenyl ether, an alkylated diphenyl sulfide, an alkylene oxide polymer and interpolymer and derivatives thereof where the terminal hydroxyl groups have been modified by esterification, an ester of a dicarboxylic acids, a phtalic acid, a succinic acid, an alkyl succinic acid and an alkenyl succinic acid, a maleic acid, an azelaic acid, a suberic acid, a sebacic acid, a fumaric acid, an adipic acid, an alkenyl malonic acid, a butyl alcohol, a hexyl alcohol, a dodecyl alcohol, a 2-ethylhexyl alcohol, an ethylene glycol diethylene glycol monoether, a propylene glycol, a dibutyl adipate, a di(2-ethylhexyl) sebacate, a di-hexyl fumarate, a dioctyl sebacate, a diisooctyl azelate, a diisodecyl azealate, a dioctyl phthalate, a didecyl phthalate, a dicicosyl sebacate, a 2-ethylhexyl diester of linoleic acid dimer, a polyol ether, a neopentyl glycol, trimethylolpropane, a pentaerythritol, a dipentaerythritol, a tripentaerythritol, a polyolester, a diester, a di-aliphatic diester of alkyl carboxylic acids such as di-2-ethylhexylazelate, di-isodecyladipate, and di-tridecyladipate, an aliphatic diester of a dicarboxylic acid, a dialkyl aliphatic diester of an alkyl dicarboxylic acid, such as di-2-ethyl hexyl azelate, di-isodecyl azelate, di-tridecyl azelate, di-isodecyl adipate, di-tridecyl adipate.

21. The method according to claim 1, wherein said synthetic oil is selected from the group having varying viscosity from about 2 to about 460 centistokes.

22. The method according to claim 1, wherein said carbon nanoparticles are selected from the group consisting of an amorphous carbon particles nanotubes, carbon fibers, short nanotubes, and combinations thereof.

23. The method according to claim 1, wherein said carbon nanoparticles are surface treated chemically to achieve certain level of hydrophilicity by an activated carbon treatment.

24. The method according to claim 1, further comprising the step of varying the amount of said carbon nanoparticles, said dispersant, and said liquid medium and maintaining an HBL value of 8 or less producing compounds having a gel, grease, or wax type consistency.

25. The method according to claim 1, wherein said dispersant is selected form the group consisting of a nonionic surfactant, an ionic surfactant, and mixtures thereof.

* * * * *